(12) United States Patent
Qiang et al.

(10) Patent No.: US 12,532,286 B2
(45) Date of Patent: Jan. 20, 2026

(54) METHOD AND APPARATUS FOR POLICY-BASED ACCESS TO NETWORKS

(71) Applicant: HUAWEI TECHNOLOGIES CO., LTD., Guangdong (CN)

(72) Inventors: Li Qiang, Beijing (CN); Jiayao Tan, Shenzhen (CN); Xiangdong Zhang, Shenzhen (CN); Lin Shu, Reading (GB)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 610 days.

(21) Appl. No.: 17/965,835

(22) Filed: Oct. 14, 2022

(65) Prior Publication Data

US 2023/0036975 A1 Feb. 2, 2023

Related U.S. Application Data

(63) Continuation of application No. PCT/CN2021/077048, filed on Feb. 20, 2021.

(30) Foreign Application Priority Data

Apr. 15, 2020 (CN) .......................... 202010297390.9

(51) Int. Cl.
*H04W 60/00* (2009.01)
*H04W 48/10* (2009.01)
*H04W 84/04* (2009.01)

(52) U.S. Cl.
CPC ........... *H04W 60/00* (2013.01); *H04W 48/10* (2013.01); *H04W 84/042* (2013.01)

(58) Field of Classification Search
CPC ... H04W 60/00; H04W 48/10; H04W 84/042; H04W 48/08; H04W 48/02; H04W 48/18; H04W 60/04; H04W 24/02; H04W 48/12
See application file for complete search history.

(56) References Cited

U.S. PATENT DOCUMENTS

2010/0075670 A1* 3/2010 Wu ...................... H04W 48/02
455/435.2
2011/0256867 A1 10/2011 Wang et al.
(Continued)

FOREIGN PATENT DOCUMENTS

CN 102845085 A 12/2012
CN 102893667 A 1/2013
(Continued)

OTHER PUBLICATIONS

Qualcomm, Summary of [PRN] Cell Selection and selection, Feb. 24-Mar. 6, 2020, 3GPP TSG-RAN WG2 Meeting #109 electronic, pp. 14-17 (Year: 2020).*
(Continued)

*Primary Examiner* — Brandon J Miller

(57) ABSTRACT

This application provides a communication method and apparatus, to separately configure, for different terminal devices in different public land mobile networks (PLMNs), different policies. The method includes: A core network element receives a registration request from a terminal device, and then sends a registration response to the terminal device based on first information and/or second information, where the registration response indicates the terminal device to set the first information. The terminal device sets the first information based on the registration response. The first information indicates a selection policy that is determined by the core network element and that is of selecting a closed access group (CAG) by the terminal device when the terminal device accesses a first PLMN, and the second information indicates a selection policy that is determined by the core network element and that is of selecting a CAG by the terminal device when the terminal device accesses the first PLMN.

21 Claims, 5 Drawing Sheets

(56) References Cited

U.S. PATENT DOCUMENTS

| | | | |
|---|---|---|---|
| 2015/0126189 A1 | | 5/2015 | Rao et al. |
| 2015/0264604 A1 | | 9/2015 | Devarayanigari et al. |
| 2020/0275279 A1* | | 8/2020 | Tangudu ............. H04W 12/068 |
| 2020/0314701 A1* | | 10/2020 | Talebi Fard .......... H04W 36/08 |

FOREIGN PATENT DOCUMENTS

| | | | |
|---|---|---|---|
| CN | 110366241 A | | 10/2019 |
| CN | 110536293 A | | 12/2019 |
| WO | 2020036364 A1 | | 2/2020 |

OTHER PUBLICATIONS

Chinese Office Action for Application No. 202010297390 dated Dec. 14, 2022, 8 pages.

International Search Report for PCT/CN2021/077048 dated Apr. 15, 2020, 9 pages.

Samsung et al., "Remaining issues related to Manual CAG Selection", 3GPP TSG RAN WG2 Meeting #109bis-e e-Meeting, Apr. 20 30, 2020 R2-2003608, total 2 pages.

Vivo et al., "Discussion on RAN2"s LS on Manual CAG ID selection and granularity of UAC parameters for PNI-NPNs, SA WG2 Meeting #138E (e-meeting) Apr. 20, 24, 2020, Elbonia, S2-2002681, total 4 pages.

European Extended Search Report for Application No. 21788555.7 dated Jul. 25, 2023, 12 pages.

Indian Office Action for Application No. 202217060979 dated Jan. 4, 2024, 10 pages.

\* cited by examiner

METHOD AND APPARATUS FOR POLICY-BASED ACCESS TO NETWORKS

CROSS-REFERENCE TO RELATED APPLICATIONS

This application is a continuation of International Application No. PCT/CN2021/077048, filed on Feb. 20, 2021, which claims priority to Chinese Patent Application No. 202010297390.9, filed on Apr. 15, 2020. The disclosures of the aforementioned applications are hereby incorporated by reference in their entireties.

TECHNICAL FIELD

This application relates to the communication field, and in particular, to a communication method and apparatus.

BACKGROUND

Public network integrated non-public network (PNI-NPN) means that a terminal device accesses a non-public network by using a public network, for example, a public land mobile network (PLMN). Further, a closed access group (CAG) technology is introduced to prevent a terminal device without non-public network access permission from accessing the non-public network by using the public network. In this case, the terminal device may access the public network in an automatic CAG selection mode or a manual CAG selection mode, to access the non-public network. The following uses a PLMN 1 and manual CAG selection as an example.

In an example, it is assumed that a CAG configuration of the PLMN 1 is {CAG 1-manual selection allowed, CAG 2-manual selection allowed, CAG 3-manual selection not allowed}, and an allowed CAG list configured for a terminal device 1 is {the CAG 1, the CAG 2}. In this case, if an allowed CAG list configured for a terminal device 2 is {the CAG 1}, neither the terminal device 1 nor the terminal device 2 can access the PLMN 1 by manually selecting the CAG 3. In other words, the foregoing CAG configuration cannot meet diversified requirements of different terminal devices in the same PLMN. To be specific, the PLMN 1 cannot configure different manual selection policies for different terminal devices, resulting in poor flexibility.

A closed subscriber group (CSG) technology is similar to the CAG technology. The terminal device may access a network in an automatic CSG selection mode or a manual CSG selection mode. However, in the manual CSG selection mode, a home public land mobile network (HPLMN) uniformly configures a manual CSG selection policy for different PLMNs such as an HPLMN and a visited public land mobile network (VPLMN), that is, the terminal device can access the HPLMN and the VPLMN by using only a same CSG configuration. In other words, in the foregoing CSG technology, different manual CSG selection policies cannot be configured for different PLMNs, and flexibility is also poor.

In conclusion, configuring different manual CAG selection policies for different terminal devices in different PLMNs becomes an urgent problem to be resolved.

SUMMARY

Embodiments of this application provide a communication method and apparatus, to flexibly configure a manual CAG selection policy and meet diversified requirements of a terminal device.

To achieve the foregoing objectives, this application provides the following technical solutions.

According to a first aspect, a communication method is provided. The communication method includes: receiving a registration request from a terminal device; and sending a registration response to the terminal device based on first information and/or second information. The first information indicates a selection policy of selecting a CAG by the terminal device when the terminal device accesses a first PLMN, the registration response indicates the terminal device to set the first information, and the second information indicates a selection policy that is determined by a core network element and that is of selecting a CAG by the terminal device when the terminal device accesses the first PLMN.

Based on the communication method in the first aspect, the core network element indicates, based on the first information that is from the terminal device and that indicates the CAG selection policy and/or based on the second information that is maintained by the core network element and that indicates the CAG selection policy, the terminal device to set the CAG selection policy for accessing the first PLMN. In this way, different CAG selection policies can be configured for different terminal devices in the first PLMN, to improve CAG selection policy configuration flexibility. Similarly, CAG selection policies may be further flexibly configured for different terminal devices in different PLMNs.

Optionally, the first information includes an identifier of the first PLMN and one or more of the following information: first indication information, a first available quantity, and a selection mode. It should be noted that the first information may include an identifier of one or more first PLMNs, the first information may include first indication information, a first available quantity, and/or a selection mode that correspond/corresponds to the one or more first PLMNs, and the selection mode may indicate a specific selection mode used by the terminal device this time to access the first PLMN.

Optionally, the first indication information indicates whether the terminal device is allowed to select a CAG, beyond an allowed CAG list, for accessing the first PLMN; the first available quantity indicates a quantity of CAGs that can be used by the terminal device when the terminal device accesses the first PLMN; and the selection mode includes a manual mode or an automatic mode. In other words, the first indication information is the CAG selection policy maintained by the terminal device side, the core network element may indicate to modify the first indication information in the first information, the first available quantity may indirectly indicate the CAG selection policy of the terminal device, and the selection mode may indicate whether the terminal device accesses the first PLMN this time in a manual mode or an automatic mode.

Optionally, the second information includes the identifier of the first PLMN and one or more of the following information: second indication information and a second available quantity. It should be noted that there may be one or more identifiers of the first PLMNs, and the second information may include second indication information and/or a second available quantity that correspond/corresponds to each of the plurality of first PLMNs.

The second indication information indicates whether the terminal device is allowed to select a CAG, beyond the allowed CAG list, for accessing the first PLMN; and the second available quantity indicates a quantity of CAGs that can be used by the terminal device when the terminal device accesses the first PLMN. In other words, the second indication information is the CAG selection policy that is maintained by the network side and that is of the terminal device, and the second available quantity is maintained by the network side and may indirectly indicate the CAG selection policy of the terminal device.

In a possible design solution, the sending a registration response to the terminal device based on first information and second information may include: determining that the first information is different from the second information, and sending the registration response to the terminal device. In other words, the core network element may determine whether the first information of the terminal device is the same as the second information of the core network element. If the first information of the terminal device is different from the second information of the core network element, the core network element may indicate the terminal device to modify the first indication information, so as to flexibly configure a CAG selection policy for the terminal device.

Optionally, that the first information is different from the second information includes: The first indication information is different from the second indication information; and/or the first available quantity is greater than the second available quantity.

In a possible design solution, the sending a registration response to the terminal device based on first information includes: determining that the first information includes the selection mode and the selection mode is the manual mode, and sending the registration response to the terminal device. In other words, if the selection mode included in the registration request indicates that the terminal device attempts to perform manual access this time, and the core network element may directly indicate the terminal device to set the first indication information, that is, update the first indication information to the second indication information and skip the step of determining whether the first information is the same as the second information. In this way, CAG configuration efficiency is improved.

Optionally, the registration response may include the second indication information and/or a cause value, and the cause value indicates that the first indication information is different from the second indication information. In other words, the core network element may send the second indication information including "allowed" or "not allowed" to the terminal device; may send the cause value to the terminal device, so as to indicate that the first indication information of the terminal device is incorrect; or send the second indication information and the cause value, so that the terminal device sets the first indication information.

In a possible design solution, the communication method in the first aspect may further include: determining the second available quantity based on the second indication information and/or the selection mode. It should be noted that the core network element may determine the second available quantity after receiving the first information from the terminal device, or may determine the second available quantity before receiving the first information from the terminal device. An occasion for determining the second available quantity is not limited in this application.

Optionally, the registration request may include the first information. In other words, the core network element may receive the CAG selection policy maintained by the terminal device side, to modify the selection policy. In this way, CAG selection policy configuration flexibility is improved.

In a possible design solution, the communication method in the first aspect may further include: sending a broadcast message to the terminal device by using an access network device. The broadcast message includes third indication information, and the third indication information indicates whether the terminal device is allowed to select a CAG, beyond the allowed CAG list, for accessing the first PLMN. In other words, before receiving the registration request from the terminal device, the core network element may broadcast the CAG selection policy by using the access network device, for example, a base station.

According to a second aspect, a communication method is provided. The communication method includes: sending a registration request to a core network element, receiving a registration response from the core network element, and setting first information based on the registration response. The first information indicates a selection policy of selecting a closed access group CAG by a terminal device when the terminal device accesses a first public land mobile network PLMN, and the registration response indicates the terminal device to set first information.

Optionally, the first information may include an identifier of the first PLMN and one or more of the following information: first indication information, a first available quantity, and a selection mode. It should be noted that the first information may include an identifier of one or more first PLMNs, the first information may include first indication information, a first available quantity, and/or a selection mode that correspond/corresponds to the one or more first PLMNs, and the selection mode may indicate a specific selection mode used by the terminal device this time to access the first PLMN.

Optionally, the first indication information indicates whether the terminal device is allowed to select a CAG, beyond an allowed CAG list, for accessing the first PLMN; the first available quantity indicates a quantity of CAGs that can be used by the terminal device when the terminal device accesses the first PLMN; and the selection mode includes a manual mode or an automatic mode. In other words, the first indication information is a CAG selection policy maintained by the terminal device side. The terminal device may set the first indication information based on the registration response. The first available quantity may indirectly indicate a manual CAG selection policy of the terminal device, and the selection mode may indicate whether the terminal device accesses the first PLMN this time in the manual mode or the automatic mode.

Optionally, the registration response may include second indication information and/or a cause value, and the cause value indicates that the first indication information is incorrect. In other words, the terminal device may receive the second indication information including "allowed" or "not allowed", may receive the cause value indicating that the first indication information of the terminal device is incorrect, or receive the second indication information and the cause value, so that the terminal device determines how to set the first indication information.

In a possible design solution, the setting the first information based on the registration response may include: modifying the first indication information into the second indication information; modifying the first indication information into "allowed" if the first indication information is "not allowed", or modifying the first indication information into "not allowed" if the first indication information is "allowed"; or setting the second indication information.

In other words, when the registration response includes the second indication information, the terminal device may modify the first indication information into the second indication information, or the terminal device may directly configure the CAG selection policy. When the registration response includes the cause value, content currently included in the first indication information is modified into other content. To be specific, the first indication information is modified into "allowed" if the first indication information is "not allowed", or the first indication information is modified into "not allowed" if the first indication information is allowed. When the registration response includes the second indication information and the cause value, a manner of modifying the first indication information by the terminal device is not limited in this application.

In a possible design solution, the communication method in the second aspect may further include: determining the first available quantity based on the first indication information and/or the selection mode.

Optionally, the registration request may include the first information. In other words, the terminal device may send the CAG selection policy maintained by the terminal device side, so that the core network element determines whether to modify the selection policy. This can improve CAG selection policy configuration flexibility.

In a possible design solution, the communication method in the second aspect may further include: receiving a broadcast message, where the broadcast message includes third indication information, and the third indication information indicates whether the terminal device is allowed to select a CAG, beyond the allowed CAG list, for accessing the first PLMN; modifying the first indication information into the third indication information if the third indication information is different from the first indication information; or skipping modifying the first indication information if the third indication information is different from the first indication information. In other words, before the terminal device sends the registration request to the core network element, the terminal device may receive the broadcast CAG selection policy. If the first indication information is different from the third indication information, the terminal device may determine, based on an actual requirement, whether to modify the first indication information.

In addition, for a technical effect of the communication method in the second aspect, refer to the technical effect of the communication method in the first aspect.

According to a third aspect, a communication apparatus is provided. The communication apparatus includes a transceiver module and a processing module.

The transceiver module is configured to receive a registration request from a terminal device. The processing module is configured to control, based on first information and/or second information, the transceiver module to send a registration response to the terminal device. The registration response indicates the terminal device to set the first information, the first information indicates a selection policy of selecting a closed access group CAG by the terminal device when the terminal device accesses a first public land mobile network PLMN, and the second information indicates a selection policy that is determined by the communication apparatus and that is of selecting a CAG by the terminal device when the terminal device accesses the first PLMN.

Optionally, the first information may include an identifier of the first PLMN and one or more of the following information: first indication information, a first available quantity, and a selection mode. The first indication information indicates whether the terminal device is allowed to select a CAG, beyond an allowed CAG list, for accessing the first PLMN; the first available quantity indicates a quantity of CAGs that can be used by the terminal device when the terminal device accesses the first PLMN; and the selection mode includes a manual mode or an automatic mode.

Optionally, the second information may include the identifier of the first PLMN and one or more of the following information: second indication information and a second available quantity. The second indication information indicates whether the terminal device is allowed to select a CAG, beyond the allowed CAG list, for accessing the first PLMN; and the second available quantity indicates a quantity of CAGs that can be used by the terminal device when the terminal device accesses the first PLMN.

In a possible design solution, the processing module is further configured to: determine that the first information is different from the second information, and control the transceiver module to send the registration response to the terminal device.

Optionally, that the first information is different from the second information includes: The first indication information is different from the second indication information; and/or the first available quantity is greater than the second available quantity.

In a possible design solution, the processing module is further configured to: determine that the first information includes the selection mode and the selection mode is the manual mode, and control the transceiver module to send the registration response to the terminal device.

Optionally, the registration response may include the second indication information and/or a cause value, and the cause value indicates that the first indication information is different from the second indication information.

In a possible design solution, the processing module is further configured to determine the second available quantity based on the second indication information and/or the selection mode.

Optionally, the registration request may include the first information.

In a possible design solution, the transceiver module is further configured to send a broadcast message to the terminal device by using an access network device. The broadcast message includes third indication information, and the third indication information indicates whether the terminal device is allowed to select a CAG, beyond the allowed CAG list, for accessing the first PLMN.

It should be noted that the transceiver module in the third aspect may include a receiving module and a sending module. The receiving module is configured to receive data and/or signaling from the terminal device. The sending module is configured to send data and/or signaling to the terminal device. A specific implementation of the transceiver module is not limited in this application.

Optionally, the communication apparatus in the third aspect may further include a storage module. The storage module stores a program or instructions. When the processing module executes the program or the instructions, the communication apparatus in the third aspect is enabled to perform the method in the first aspect.

It should be noted that the communication apparatus in the third aspect may be a core network element, or may be a chip (system) or another component or assembly that can be disposed in a core network element. This is not limited in this application.

In addition, for a technical effect of the communication apparatus in the third aspect, refer to the technical effect of the communication method in any possible implementation of the first aspect.

According to a fourth aspect, a communication apparatus is provided. The communication apparatus includes a transceiver module and a processing module.

The transceiver module is configured to send a registration request to a core network element. The transceiver module is further configured to receive a registration response from the core network element. The registration response indicates the communication apparatus to set first information, and the first information indicates a selection policy of selecting a closed access group CAG by the communication apparatus when the communication apparatus accesses a first public land mobile network PLMN. The processing module is configured to set the first information based on the registration response.

Optionally, the first information may include an identifier of the first PLMN and one or more of the following information: first indication information, a first available quantity, and a selection mode. The first indication information indicates whether the communication apparatus is allowed to select a CAG, beyond an allowed CAG list, for accessing the first PLMN; the first available quantity indicates a quantity of CAGs that can be used by the communication apparatus when the communication apparatus accesses the first PLMN; and the selection mode includes a manual mode or an automatic mode.

Optionally, the registration response may include second indication information and/or a cause value, and the cause value indicates that the first indication information is incorrect.

In a possible design solution, the processing module is further configured to modify the first indication information into the second indication information; the processing module is further configured to: modify the first indication information into "allowed" if the first indication information is "not allowed", or the processing module is further configured to modify the first indication information into "not allowed" if the first indication information is "allowed"; or the processing module is further configured to set the second indication information.

In a possible design solution, the processing module is further configured to determine the first available quantity based on the first indication information and/or the selection mode.

Optionally, the registration request may include the first information.

In a possible design solution, the transceiver module is further configured to receive a broadcast message. The broadcast message includes third indication information, and the third indication information indicates whether the communication apparatus is allowed to select a CAG, beyond the allowed CAG list, for accessing the first PLMN. The processing module is further configured to modify the first indication information into the third indication information if the third indication information is different from the first indication information; or the processing module is further configured to skip modifying the first indication information if the third indication information is different from the first indication information.

It should be noted that the transceiver module in the fourth aspect may include a receiving module and a sending module. The receiving module is configured to receive data and/or signaling from the core network element. The sending module is configured to send data and/or signaling to the core network element. A specific implementation of the transceiver module is not limited in this application.

Optionally, the communication apparatus in the fourth aspect may further include a storage module. The storage module stores a program or instructions. When the processing module executes the program or the instructions, the communication apparatus in the fourth aspect is enabled to perform the method in the second aspect.

It should be noted that the communication apparatus in the fourth aspect may be a terminal device, or may be a chip (system) or another component or assembly that can be disposed in a terminal device. This is not limited in this application.

In addition, for a technical effect of the communication apparatus in the fourth aspect, refer to the technical effect of the communication method in any possible implementation of the first aspect.

According to a fifth aspect, a communication apparatus is provided. The communication apparatus includes a processor and a communication interface. The processor is configured to: communicate with another apparatus through the communication interface, and perform the communication method in any possible implementation of the first aspect and the second aspect. The communication interface may be a transceiver circuit, and is used by the communication apparatus to communicate with another communication apparatus.

In a possible design, the communication apparatus in the fifth aspect may further include a memory. The memory is configured to store a computer program. The transceiver may be used by the communication apparatus to communicate with another communication apparatus.

In this application, the communication apparatus in the fifth aspect may be a core network element, a terminal device, or a chip (system) or another component or assembly that may be disposed in a core network element or a terminal device.

In addition, for a technical effect of the communication apparatus in the fifth aspect, refer to the technical effect of the communication method in any possible implementation of the first aspect and the second aspect.

According to a sixth aspect, a communication system is provided. The system includes a core network element. Optionally, the communication system may further include an access network device. Optionally, the communication system may further include a terminal device. The core network element may be an AMF network element.

According to a seventh aspect, a computer-readable storage medium is provided. The computer-readable storage medium includes a computer program or instructions. When the computer program or the instructions are run on a computer, the computer is enabled to perform the communication method in any possible implementation of the first aspect and the second aspect.

According to an eighth aspect, a computer program product is provided, including a computer program or instructions. When the computer program or the instructions are run on a computer, the computer is enabled to perform the communication method in any possible implementation of the first aspect and the second aspect.

DESCRIPTION OF EMBODIMENTS

Figure 1:
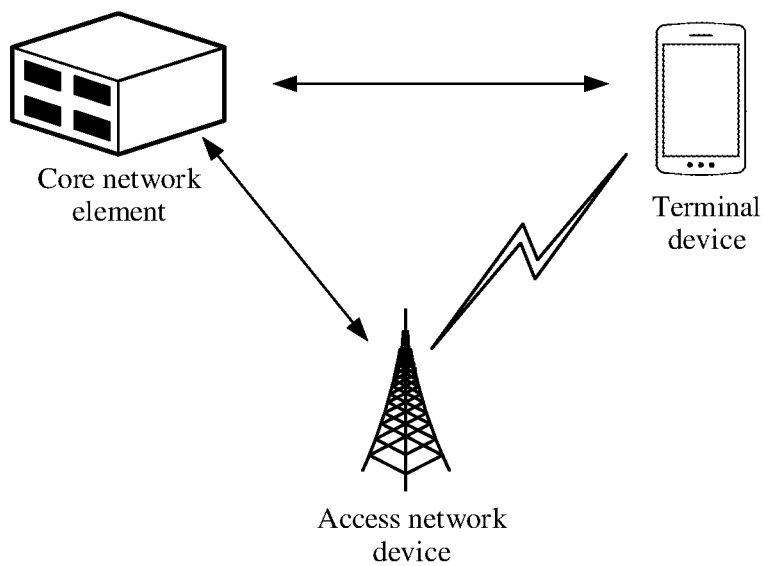
FIG. 1 is a schematic diagram of an architecture of a communication system according to an embodiment of this application.

The following describes technical solutions of this application with reference to accompanying drawings.

The technical solutions in embodiments of this application may be applied to various communication systems such as a wireless fidelity (WiFi) system, a vehicle-to-everything (V2X) communication system, a device-to-device (D2D) communication system, an internet of vehicles communication system, a 4th generation (4G) mobile communication system, for example, a long term evolution (LTE) system, a worldwide interoperability for microwave access (WiMAX) communication system, a 5th generation (5G) mobile communication system, for example, a new radio (NR) system, and a future communication system, for example, a 6th generation (6G) mobile communication system.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompany drawings. In addition, a combination of these solutions may be used.

In addition, in embodiments of this application, terms such as "example" and "for example" are used to represent giving an example, an illustration, or a description. Any embodiment or design solution described as an "example" in this application should not be explained as being more preferred or having more advantages than another embodiment or design solution. Exactly, the term "example" is intended to present a concept in a specific manner.

In embodiments of this application, terms "information", "signal", "message", "channel", and "signaling" may sometimes be interchangeably used. It should be noted that, meanings expressed by the terms are consistent when differences between the terms are not emphasized. Terms "of", "corresponding or relevant (corresponding, relevant)", and "corresponding (corresponding)" may sometimes be interchangeably used. It should be noted that meanings expressed by the terms are consistent when differences between the terms are not emphasized.

In embodiments of this application, sometimes a subscript, for example, $W_1$, may be written in an incorrect form, for example, W1. Expressed meanings are consistent when differences are not emphasized.

A network architecture and a service scenario that are described in embodiments of this application are intended to describe the technical solutions in embodiments of this application more clearly, and do not constitute a limitation on the technical solutions provided in embodiments of this application. A person of ordinary skill in the art may know that, with evolution of the network architecture and emergence of new service scenarios, the technical solutions provided in embodiments of this application are also applicable to similar technical problems in future network architectures and service scenarios.

FIG. 1 is a schematic diagram of an architecture of a communication system to which a communication method provided in embodiments of this application is applicable. For ease of understanding embodiments of this application, a communication system shown in FIG. 1 is first used as an example to describe in detail a communication system to which embodiments of this application are applicable. It should be noted that the solutions in embodiments of this application may also be applied to another mobile communication system, and a corresponding name may also be replaced by a name of a corresponding function in the other mobile communication system.

As shown in FIG. 1, the communication system includes a core network element and a terminal device. Optionally, the communication system may further include an access network device.

The core network element is a device that is located on a network side of the communication system and that provides a network service for the terminal device, or a chip (system) or another component or assembly that can be disposed in the device. The core network element includes but is not limited to an access management network element. The access management network element is mainly configured to perform mobility management and access management, is responsible for transferring a user policy and the like between user equipment and a policy control function (PCF) network element, and may be configured to implement a function, other than session management, in functions of a mobility management entity (MME), for example, lawful interception and access authorization/authentication. In a 5G communication system, the access management network element may be an access and mobility management function (core access and mobility management function, AMF) network element. In a future communication system, the access management network element may still be an AMF, or may have another name. This is not limited in this application.

The terminal device is a terminal that accesses the communication system and has wireless sending and receiving functions, or a chip or a chip system that can be disposed in the terminal. The terminal device may also be referred to as a user equipment, an access terminal, a subscriber unit, a subscriber station, a mobile station, a mobile, a remote station, a remote terminal, a mobile device, a user terminal, a terminal, a wireless communication device, a user agent, or a user apparatus. The terminal device in embodiments of this application may be a mobile phone, a tablet computer (Pad), a computer having the wireless sending and receiving functions, a virtual reality (VR) terminal device, an augmented reality (AR) terminal device, a wireless terminal in industrial control, a wireless terminal in self driving, a wireless terminal in remote medical, a wireless terminal in smart grid, a wireless terminal in transportation safety, a wireless terminal in smart city, a wireless terminal in smart home, a vehicle-mounted terminal, an road side unit (RSU) that has a terminal function, or the like. The terminal device in this application may alternatively be an automobile module, an automobile assembly, an on-board component, an automotive chip, or an on-board unit that is built in a vehicle as one or more components or units. The vehicle may implement the communication method in this application by using the automobile module, the automobile assembly, the on board component, the automotive chip, or the on board unit that is built in the vehicle.

The access network device is a device that is located on the network side of the communication system and that has wireless sending and receiving functions, or a chip (system) or another component or assembly that can be disposed in the device. The access network device includes but is not limited to: an access point (AP) in a wireless fidelity (WiFi) system, for example, a home gateway, a router, a server, a switch, and a bridge, an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a wireless relay node, a wireless backhaul node, a transmission point (transmission and reception point, TRP; or transmission point, TP), and the like. The access network device may alternatively be a gNB or a transmission point (TRP or TP) in a 5G system, for example, a new radio (NR) system, or one antenna panel or a group of antenna panels (including a plurality of antenna panels) in a base station in a 5G system. The network device may alternatively be a network node that constitutes a gNB or a transmission point, for example, a baseband unit (BBU), a distributed unit (DU), or a RSU having a base station function.

It should be noted that the communication method provided in embodiments of this application is applicable to communication between the core network element and the terminal device shown in FIG. 1.

It should be understood that FIG. 1 is merely a simplified schematic diagram of an example for ease of understanding. The communication system may further include another network device and/or another terminal device that are/is not shown in FIG. 1.

Figure 2:
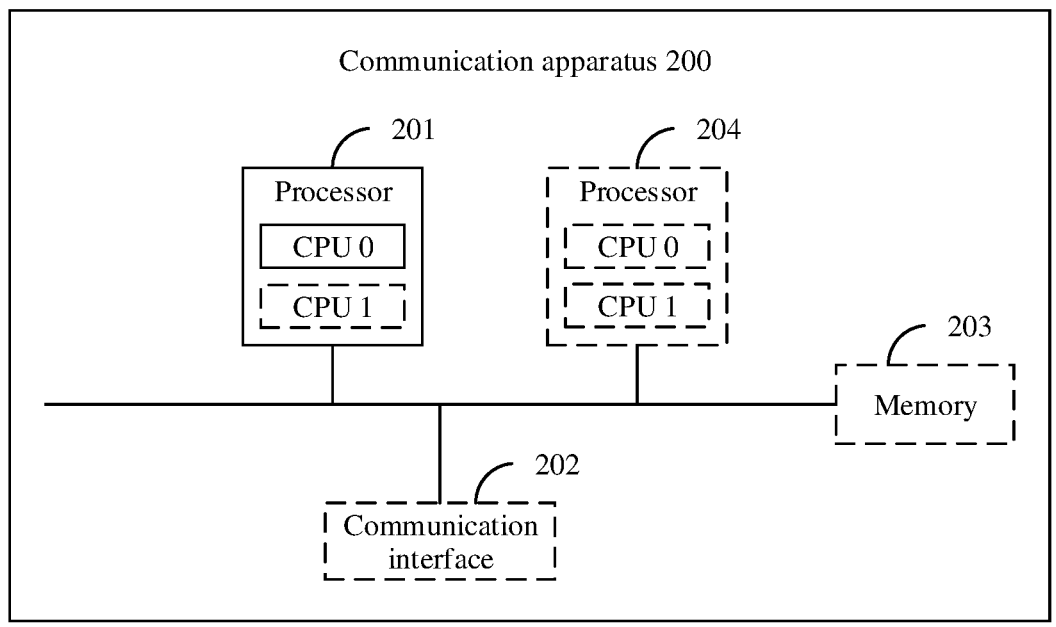
FIG. 2 is a schematic diagram of a structure of a communication apparatus according to an embodiment of this application.

FIG. 2 is a schematic diagram of a structure of a communication apparatus that can be configured to perform the communication method according to embodiments of this application. The communication apparatus may be a core network element, or may be a chip (system) or another component or assembly that can be used for a core network element. Alternatively, the communication apparatus may be a terminal device, or may be a chip (system) or another component or assembly that can be used for a terminal device.

As shown in FIG. 2, the communication apparatus 200 includes a processor 201 and a communication interface 202. The processor 201 may be integrated with the communication interface 202, or may exist independently. Optionally, the communication apparatus 200 may further include a memory 203. The memory 203 may be integrated with the processor 201, or may exist independently. This is not limited in this embodiment of this application.

The following describes each component of the communication apparatus 200 with reference to FIG. 2.

The processor 201 is a control center of the communication apparatus 200, and may be one processor, or may be a collective name of a plurality of processing elements. For example, the processor 201 is one or more central processing units (CPU), or may be an application-specific integrated circuit (ASIC) or one or more integrated circuits configured to implement embodiments of this application, for example, one or more microprocessors (digital signal processor, DSP) or one or more field programmable gate arrays (FPGA).

The processor 201 may perform various functions of the communication apparatus 200 by running or executing a software program stored in the memory 203 and invoking data stored in the memory 203.

During specific implementation, in an embodiment, the processor 201 may include one or more CPUs, for example, a CPU 0 and a CPU 1 shown in FIG. 2.

During specific implementation, in an embodiment, the communication apparatus 200 may alternatively include a plurality of processors, for example, the processor 201 and a processor 204 shown in FIG. 2. Each of these processors may be a single-core processor (single-CPU), or may be a multi-core processor (multi-CPU). The processor herein may be one or more communication devices, circuits, and/or processing cores configured to process data (for example, a computer program instruction).

The memory 203 may be a read-only memory (ROM) or another type of static storage communication device capable of storing static information and instructions, or a random access memory (RAM) or another type of dynamic storage communication device capable of storing information and instructions; or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blue-ray disc, or the like), a magnetic disk storage medium or another magnetic storage communication device, or any other medium capable of carrying or storing expected program code in a form of an instruction or a data structure and accessible by a computer. However, this is not limited thereto.

The memory 203 is configured to store a software program for executing the solutions of this application, and the processor 201 controls the execution. For the foregoing specific implementation, refer to the following method embodiments.

The communication interface 202 may be a transceiver circuit, and is configured to communicate with another communication apparatus. For example, the communication apparatus 200 is a core network element, and the communication interface 202 may be configured to communicate with a terminal device. For another example, the communication apparatus 200 is a terminal device, and the communication interface 202 may be configured to communicate with a core network element. In addition, the transceiver circuit may be an apparatus, for example, a transceiver or a transceiver machine. Alternatively, the communication interface 202 may be an input/output (I/O) circuit of the processor 201, and is configured to implement signal input and signal output of the processor 201.

It should be noted that a structure of the communication apparatus 200 shown in FIG. 2 does not constitute a limitation on the communication apparatus. An actual communication apparatus may include more or fewer components than those shown in the figure, combine some components, or have different component arrangements.

Figure 3:
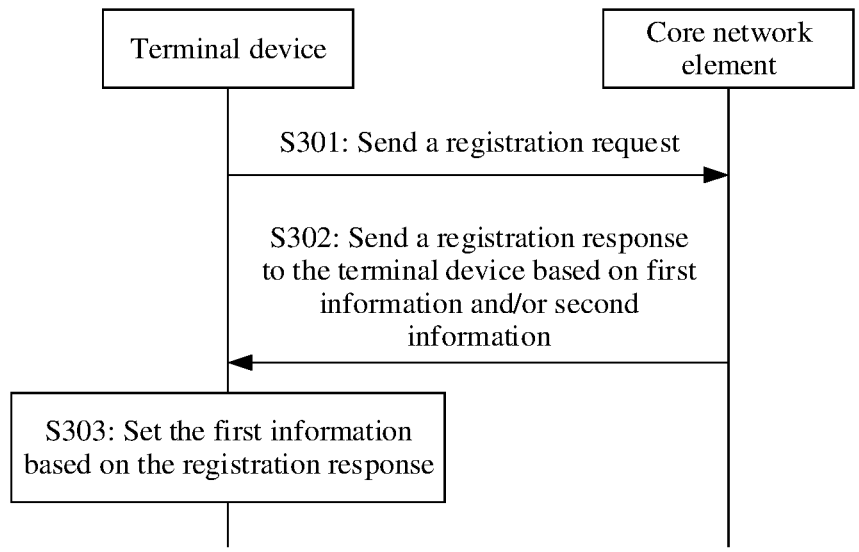
FIG. 3 is a schematic flowchart of a communication method according to an embodiment of this application.

The following describes, with reference to FIG. 3, a communication method according to an embodiment of this application.

FIG. 3 is a schematic flowchart of a communication method according to an embodiment of this application. The communication method is applicable to communication between the core network element and the terminal device shown in FIG. 1.

As shown in FIG. 3, the communication method includes the following steps.

S301: The terminal device sends a registration request to the core network element. Correspondingly, the core network element receives the registration request from the terminal device.

Optionally, the registration request may include first information. The first information indicates a selection policy of selecting a CAG by the terminal device when the terminal device accesses a first PLMN. Specifically, in this step, the first information may also indicate the selection policy that is determined by the terminal device and that is of selecting the CAG by the terminal device when the terminal device accesses the first PLMN. In other words, the first information is information on the terminal device side, and indicates the CAG selection policy for accessing the first PLMN.

Optionally, the first information may include an identifier of the first PLMN and one or more of the following information: first indication information, a first available quantity, and a selection mode.

It should be noted that the first information may include an identifier of one or more first PLMNs, and first indication information, a first available quantity, and/or a selection mode that correspond/corresponds to each of the one or more first PLMNs. In this case, CAG selection policies of the terminal device in the plurality of PLMNs may be determined based on the identifier of the first PLMN.

The first indication information indicates whether the terminal device is allowed to select a CAG, beyond an allowed CAG list, for accessing the first PLMN. The first indication information may include "allowed" (allow, can, or yes) or "not allowed" (non-allow, not-allow, cannot, or no), and the first indication information may indicate a CAG selection policy maintained by the terminal device side.

It should be noted that the allowed CAG list indicates that the terminal device can access a corresponding PLMN by using a CAG in the allowed CAG list, for example, {a CAG 1, a CAG 2}. For example, the first PLMN is a PLMN 1, and {the CAG 1, the CAG 2} indicates that the PLMN 1 may be accessed by using the CAG 1 and the CAG 2.

Optionally, the allowed CAG list may be preset, or may be sent by the core network element to the terminal device by using a non-access stratum (NAS) protocol layer message. For example, the core network element sends the allowed CAG list to the terminal device by using a first NAS protocol layer message. It should be noted that the terminal device may alternatively obtain the allowed CAG list in another manner. This is not limited in this application.

Optionally, the first indication information may be preset, or may be an agreed default value. If the first indication information is not configured, it may be agreed that the first indication information is "allowed" by default, or it is agreed that the first indication information is "not allowed" by default. Alternatively, the first indication information may be sent by the core network element to the terminal device by using a NAS protocol layer message. For example, the core network element sends the first indication information to the terminal device by using a second NAS protocol layer message.

Optionally, the first indication information may alternatively be configured together with the allowed CAG list. For example, the first indication information is preset when the allowed CAG list is preset. For another example, the core network element sends the allowed CAG list and the first indication information to the terminal device by using a third NAS protocol layer message.

Optionally, the selection mode includes a manual mode or an automatic mode. In this case, the selection mode may indicate the terminal device to select a CAG in the manual selection mode or the automatic selection mode this time for accessing a corresponding PLMN.

In a possible design solution, a specific implementation in which the terminal device selects the CAG in the automatic mode for accessing the PLMN may include the following step 1 to step 3.

Step 1: The terminal device is preconfigured with or obtains a CAG information list from the core network element, where the CAG information list includes an allowed CAG list and an identifier of the corresponding PLMN.

For example, the CAG information list may include the PLMN 1 {the CAG 1, the CAG 2} and a PLMN 2 {a CAG 4, a CAG 5, a CAG 7}. In other words, the terminal device is allowed to access the PLMN 1 by using the CAG 1 and the CAG 2, and access the PLMN 2 by using the CAG 4 and the CAG 5.

Step 2: The core network element sends a first broadcast message by using an access network device, where the first broadcast message may include supported CAG information of the core network element, and specifically includes a supported CAG list of the core network element and an identifier of a corresponding PLMN. The supported CAG list of the core network element includes supported CAG identifiers of the core network element.

For example, the supported CAG information of the core network element may include the PLMN 1 {the CAG 1, the CAG 2, a CAG 3, a CAG 6} and the PLMN 2 {the CAG 4, the CAG 5}.

Step 3: The terminal device obtains the first broadcast message, and compares the supported CAG information of the core network element with the CAG information list of the terminal device. If a CAG that is allowed to be used by the terminal device and that is supported by the core network element exists in a same PLMN, the terminal device may select the CAG in the automatic mode for accessing the corresponding PLMN.

For example, based on the CAG information list in step 1 and the first broadcast message in step 2, the terminal device may select the CAG 1 and CAG 2 in the automatic mode for accessing the PLMN 1, and may select the CAG 4 and the CAG 5 in the automatic mode for accessing the PLMN 2. In other words, the terminal device may automatically select a CAG that exists in both the allowed CAG list and the supported CAG list of the core network element, for accessing the corresponding PLMN.

In another possible design solution, in a process in which the terminal device selects the CAG in the manual mode for accessing the PLMN, reference needs to be made to the manual selection policy, that is, when the terminal device selects the CAG in the manual mode, whether a CAG beyond the allowed CAG list is allowed to be selected for accessing the first PLMN. In other words, the first indication information may indicate whether the terminal device is allowed to select the CAG, beyond the allowed CAG list, in the manual mode for accessing the first PLMN.

It should be noted that when the first indication information is "allowed" and the same PLMN is accessed, a selection range in which the terminal device selects the CAG in the manual mode may be greater than a selection range in which the CAG is selected in the automatic mode. Alternatively, when the first indication information is "not allowed" and the same PLMN is accessed, a selection range in which the terminal device selects the CAG in the manual mode is equal to a selection range in which the CAG is selected in the automatic mode.

In an example, it is assumed that the terminal device is allowed to select a CAG, beyond the allowed CAG list, for accessing the first PLMN. Based on the CAG information list in step 1 and the first broadcast message in step 2, the terminal device may select the CAG 1, the CAG 2, the CAG 3, and the CAG 6 in the manual mode for accessing the PLMN 1, and may select the CAG 4 and the CAG 5 in the manual mode for accessing the PLMN 2. In other words, due to impact of the supported CAG information of the core network element, when the terminal device accesses the PLMN1, a selection range in which the terminal device selects a CAG in the manual mode is greater than a selection range in which the terminal device selects the CAG in the automatic mode.

In another example, it is assumed that the terminal device is not allowed to select a CAG, beyond the allowed CAG list, for accessing the first PLMN. Based on the CAG information list in step 1 and the first broadcast message in step 2, the terminal device may select the CAG 1 and the CAG 2 in the manual mode for accessing the PLMN 1, and select CAG 4 and CAG 5 in the manual mode for accessing the PLMN 2.

Optionally, the first available quantity indicates a quantity of CAGs that can be used by the terminal device when the terminal device accesses the first PLMN. In other words, the available quantity of CAGs that is determined by the terminal device may indirectly indicate a selection policy of selecting a CAG by the terminal device.

Optionally, the terminal device may determine the first available quantity based on the first indication information and/or the selection mode. The following specifically describes an implementation in which the terminal device determines the first available quantity.

In a possible design solution, the terminal device may determine the first available quantity based on the selection mode.

Optionally, if the selection mode is the automatic mode, the terminal device may automatically select, for accessing a corresponding PLMN, a CAG that exists in both the allowed CAG list and the supported CAG list of the core network element, where first available quantity=|supported CAG list of the core network element∩allowed CAG list|, where ∩ indicates an intersection set.

Accessing the PLMN 1 is used as an example. It is assumed in the example that the CAG information list includes the PLMN 1 {the CAG 1, the CAG 2}, and the supported CAG information of the core network element is the PLMN 1 {the CAG 1, the CAG 2, the CAG 3, the CAG 6}. In this case, the terminal device may automatically select the CAG 1 and the CAG 2 for accessing the PLMN 1, that is, first available quantity=2.

In another possible design solution, the terminal device may determine the first available quantity based on the first indication information and the selection mode.

Optionally, if the selection mode is the manual mode and the first indication information is "allowed", the terminal device may manually select, for accessing the corresponding PLMN, all CAGs in the supported CAG list of the core network element, where first available quantity=|supported CAG list of the core network element|.

Accessing the PLMN 1 is used as an example. It is assumed in the example that the CAG information list includes the PLMN 1 {the CAG 1, the CAG 2}, and the supported CAG information of the core network element is the PLMN 1 {the CAG 1, the CAG 2, the CAG 3, the CAG 6}. In this case, the terminal device may manually select the CAG 1, the CAG 2, the CAG 3, and the CAG 6 for accessing the PLMN 1, that is, first available quantity=4.

Optionally, if the selection mode is the manual mode and the first indication information is "not allowed", the terminal device may manually select, for accessing a corresponding PLMN, a CAG that exists in both the allowed CAG list and the supported CAG list of the core network element, that is, first available quantity=|supported CAG list of the core network element∩allowed CAG list|.

Accessing the PLMN 1 is used as an example. It is assumed in the example that the CAG information list includes the PLMN 1 {the CAG 1, the CAG 2}, and the supported CAG information of the core network element is the PLMN 1 {the CAG 1, the CAG 2, the CAG 3, the CAG 6}. In this case, the terminal device may manually select the CAG 1 and the CAG 2 for accessing the PLMN 1, that is, first available quantity=2.

In other words, if the first available quantity is 2, it may be deduced that the selection policy of the terminal device is as follows: The selection mode is the automatic mode, or the selection mode is the manual mode and the first indication information is "not allowed". If the first available quantity is 4, it may be deduced that the selection policy of the terminal device is as follows: The selection mode is the manual mode and the first indication information is "allowed". In this case, the first available quantity may indirectly indicate a selection policy of selecting a CAG by the terminal device.

In a possible design solution, the core network element may send the broadcast message to the terminal device by using the access network device. Correspondingly, the terminal device may receive the broadcast message. In other words, before the terminal device sends the registration request to the core network element in S301, the core network element may send the broadcast message to the terminal device by using the access network device.

The broadcast message may include third indication information, and the third indication information indicates whether the terminal device is allowed to select a CAG, beyond the allowed CAG list, for accessing the first PLMN. The third indication information may include "allowed" (allow, can, or yes) or "not allowed" (non-allow, not-allow, can not, or no).

Optionally, the terminal device may determine whether the third indication information is the same as the first indication information.

In other words, before the terminal device sends the registration request to the core network element in S301, the terminal device may receive the broadcast CAG selection policy. If determining that the first indication information is different from the third indication information, the terminal device may determine, based on an actual requirement, to use the first indication information or the third indication information.

Optionally, the terminal device may modify the first indication information into the third indication information if the third indication information is different from the first indication information. In other words, the terminal device determines to use the third indication information.

Alternatively, optionally, the terminal device may not modify the first indication information if the third indication information is different from the first indication information. In other words, the terminal device determines to use the first indication information.

It should be noted that the terminal device may omit the step of determining whether the third indication information is the same as the first indication information, and directly determine, based on an actual requirement, whether to modify the first indication information.

S302: The core network element sends a registration response to the terminal device based on the first information and/or second information. Correspondingly, the terminal device receives the registration response from the core network element.

The registration response indicates the terminal device to set the first information, and the second information indicates a selection policy that is determined by the core network element and that is of selecting a CAG by the terminal device when the terminal device accesses the first PLMN. In other words, the second information is a selection policy that is maintained by the core network element side and that indicates CAG selection of the terminal device.

Optionally, the second information may include the identifier of the first PLMN and one or more of the following information: second indication information and a second available quantity.

It should be noted that the second information may include second indication information and/or a second available quantity corresponding to one or more first PLMNs. In this case, a CAG selection policy that is maintained by the core network element side and that is of the terminal device in the plurality of PLMNs may be determined based on the identifier of the second PLMN.

The second indication information indicates whether the terminal device is allowed to select a CAG, beyond the allowed CAG list, for accessing the first PLMN. The second indication information may include "allowed" (allow, can, or yes) or "not allowed" (non-allow, not-allow, cannot, or no), and the second indication information may indicate the CAG selection policy maintained by the core network element side.

It should be noted that a main difference between the second indication information and the first indication information lies in that the first indication information is information maintained by the terminal device side, and the second indication information is information maintained by the core network element side. The second indication information may be stored in subscription information of the core network element side.

Optionally, the second available quantity indicates a quantity of CAGs that can be used by the terminal device when the terminal device accesses the first PLMN. In other words, the second available quantity may indirectly represent a selection policy that is determined by the core network element and that is used by the terminal device to select a CAG.

Optionally, the core network element may determine the second available quantity based on the second indication information and/or the selection mode.

It should be noted that the core network element may determine the second available quantity after receiving the first information from the terminal device, or may determine the second available quantity before receiving the first information from the terminal device. An occasion for determining the second available quantity is not limited in this application.

Optionally, it is assumed that the core network element determines the second available quantity after receiving the first information from the terminal device. If the first information includes the selection mode, the core network element needs to determine only the second available quantity corresponding to the selection mode.

For example, the second indication information is "not allowed". It is assumed that the first information includes the selection mode, and the selection mode is the manual mode. In this case, the core network element needs to determine only the second available quantity corresponding to the manual mode and the condition that the second indication information is "not allowed".

Optionally, it is assumed that the core network element determines the second available quantity after receiving the first information from the terminal device. If the first information does not include the selection mode, the core network element determines second available quantities respectively corresponding to the automatic mode and the manual mode.

For example, if the second indication information is "allowed", the core network element may determine a second available quantity corresponding to the automatic mode, and a second available quantity corresponding to the manual mode and the condition that the second indication information is "allowed".

For another example, if the second indication information is "not allowed", the core network element may determine a second available quantity corresponding to the automatic mode, and a second available quantity corresponding to the manual mode and the condition that the second indication information is "not allowed".

Alternatively, optionally, if the core network element determines the second available quantity before receiving the first information from the terminal device, the core network element determines second available quantities respectively corresponding to the automatic mode and the manual mode.

For example, if the second indication information is "allowed", the core network element may determine a second available quantity corresponding to the automatic mode, and a second available quantity corresponding to the manual mode and the condition that the second indication information is "allowed".

For another example, if the second indication information is "not allowed", the core network element may determine a second available quantity corresponding to the automatic mode, and a second available quantity corresponding to the manual mode and the condition that the second indication information is "not allowed".

The following specifically describes an implementation in which the core network element determines the second available quantity.

In a possible design solution, the core network element may determine the second available quantity based on the selection mode.

Specifically, if the selection mode is the automatic mode, for a specific implementation in which the core network element determines the second available quantity, refer to the implementation in which the terminal device determines the first available quantity based on the selection mode in S301.

In another possible design solution, the core network element may determine the second available quantity based on the second indication information and the selection mode.

For example, if the selection mode is the manual mode and the second indication information is "allowed", for a specific implementation in which the core network element determines the second available quantity, refer to the specific implementation in which the terminal device determines the first available quantity when the selection mode is the manual mode and the first indication information is "allowed" in S301.

For another example, if the selection mode is the manual mode and the second indication information is "not allowed", for a specific implementation in which the core network element determines the second available quantity, refer to the specific implementation in which the terminal device determines the first available quantity when the selection mode is the manual mode and the first indication information is "not allowed" in S301.

Optionally, the registration response may include the second indication information and/or a cause value. The cause value indicates that the first indication information is different from the second indication information. In other words, the core network element may send the second indication information including "allowed" or "not allowed" to the terminal device; may send, to the terminal device, the cause value indicating that the first indication information is incorrect; or send the second indication information and the cause value, to indicate the terminal device to modify the first indication information of the first information.

Optionally, the registration response may include a first allowed CAG list and the second indication information. The registration response indicates whether the terminal device is allowed to select a CAG, in the first allowed CAG list, for accessing the first PLMN.

The PLMN 1 is used as an example. It is assumed in the example that the first allowed CAG list is {the CAG 1, the CAG 2}, and the second indication information is "allowed". In this case, it indicates that the terminal device is allowed to manually select the CAG 1 and the CAG 2 for accessing the PLMN 1.

It should be noted that the cause value in this embodiment of this application may be a cause value newly defined in a protocol, or an existing cause value in a protocol may be reused.

In a possible design solution, step S302 of sending, by the core network element, a registration response to the terminal device based on the first information and second information may include: determining that the first information is different from the second information, and sending the registration response to the terminal device.

In other words, the core network element may determine whether the first information is the same as the second information. If the first information is different from the second information, the core network element indicates the terminal device to modify the first indication information. If the first information is the same as the second information, the core network element indicates the terminal device to perform registration according to an existing registration procedure. For a specific implementation, refer to a conventional technology. Details are not described in this embodiment of this application.

Optionally, that the first information is different from the second information may include: The first indication information is different from the second indication information, and/or the first available quantity is greater than the second available quantity. In this case, if it is determined that the first indication information is different from the second indication information, and/or the first available quantity is greater than the second available quantity, the core network element sends the registration response to the terminal device, to indicate the terminal device to modify the first indication information.

Specifically, how to determine whether the first information is the same as the second information is related to specific content included in the first information. A specific example is as follows. It should be noted that the implementation in which the PLMN 1 is used as an example in this embodiment of this application is also applicable to another PLMN, for example, the PLMN 2, so that CAG selection policies of terminal devices in different PLMNs can be flexibly configured.

In an example, it is assumed that the CAG information list includes the PLMN 1 {the CAG 1, the CAG 2}, the supported CAG information of the core network element is the PLMN 1 {the CAG 1, the CAG 2, the CAG 3, the CAG 6}, and the second indication information maintained by the core network element side is "not allowed". In this case, when the selection mode is the automatic mode, the second available quantity is 2; or when the selection mode is the manual mode, the second available quantity is 2, and the first indication information maintained by the terminal device side is "allowed".

In an example, it is assumed that the first information includes the identifier of the first PLMN and the first indication information, the first information is PLMN 1-allowed, the first indication information is "allowed", and the second indication information is "not allowed". If the first indication information is inconsistent with the second indication information, the core network element indicates the terminal device to modify the first indication information.

In an example, it is assumed that the first information includes the identifier of the first PLMN and the first available quantity, the first information is PLMN 1-2, and 2 indicates that the first available quantity is 2. If the first available quantity is equal to the second available quantity, the terminal device does not modify the first indication information of the terminal device.

In an example, it is assumed that the first information includes the identifier of the first PLMN and the first available quantity, the first information is PLMN 1-4, and 4 indicates that the first available quantity is 4. If the first available quantity is greater than the second available quantity, the terminal device is indicated to modify the first indication information.

In other words, the first available quantity 4 is not equal to the second available quantity 2 corresponding to the automatic selection mode. It may be deduced that the terminal device may select the CAG in the manual selection mode, instead of selecting the CAG in the automatic selection mode. However, the first available quantity 4 is also not equal to the second available quantity 2 corresponding to the manual mode. It may be deduced that the terminal device modifies the first indication information if the first indication information is different from the second indication information.

In an example is assumed that the CAG information list includes the PLMN 1 {the CAG 1, the CAG 2}, the supported CAG information of the core network element is the PLMN 1 {the CAG 1, the CAG 2, the CAG 3, the CAG 6}, and the second indication information maintained by the core network element side is "allowed". In this case, when the selection mode is the automatic mode, the second available quantity is 2; or when the selection mode is the manual mode, the second available quantity is 4, and the first indication information maintained by the terminal device side is "not allowed".

In an example, it is assumed that the first information includes the identifier of the first PLMN and the first indication information, the first information is PLMN 1-not allowed, the first indication information is "not allowed", and the second indication information is "allowed". If the first indication information is inconsistent with the second indication information, the core network element indicates the terminal device to modify the first indication information.

Specifically, when the first available quantity is equal to the second available quantity corresponding to the automatic selection mode, and is less than the second available quantity corresponding to the manual selection mode, the first indication information may not be modified.

In an example, it is assumed that the first information includes the identifier of the first PLMN and the first available quantity, the first information is PLMN 1-2, and 2 indicates that the first available quantity is 2. If the first available quantity is equal to the second available quantity, the terminal device does not modify the first indication information of the terminal device.

In other words, if the first available quantity 2 is equal to the second available quantity 2 corresponding to the automatic mode, the terminal device may select the CAG in the automatic mode. If the terminal device selects the CAG in the automatic mode, the terminal device does not modify the first indication information. However, if the first available quantity corresponding to the manual mode and the case in which the first indication information is "not allowed" is also 2, the terminal device may use the manual mode and the selection policy that the first indication information is "not allowed", to select the CAG. If the terminal device uses the manual mode and the selection policy that the first indication information is "not allowed", the terminal device may not modify the first indication information. A reason why the first indication information is not modified temporarily is as follows: Although the first available quantity 2 is not equal to the second available quantity 4 corresponding to the manual mode, because a selection range that is maintained by the terminal device side and that is for manual CAG selection falls within a selection range that is allowed by the core network element and that is for manual CAG selection by the terminal device, a problem of inconsistency between the first indication information and the second indication information may be temporarily tolerated.

Specifically, when the first information includes the first indication information and the first available quantity, the core network element may not determine whether the first available quantity is greater than the second available quantity, and indicate the terminal device to modify the first indication information, provided that the first indication information is different from the second indication information.

In an example, it is assumed that the first information includes the identifier of the first PLMN, the first indication information, and the first available quantity, the first information is PLMN 1-not allowed-2, the first indication information is "not allowed", and 2 indicates that the first available quantity is 2. If the first indication information is inconsistent with the second indication information, the core network element indicates the terminal device to modify the first indication information.

In an example, it is assumed that the first information includes the identifier of the first PLMN, the first indication information, and the selection mode, the first information is PLMN 1-not allowed-automatic mode, and the first indication information is "not allowed". If the first indication information is inconsistent with the second indication information, the core network element indicates the terminal device to modify the first indication information.

In an example, it is assumed that the first information includes the identifier of the first PLMN, the first indication information, the first available quantity, and the selection mode, the first information is PLMN 1-not allowed-2-automatic mode, the first indication information is "not allowed", and 2 indicates that the first available quantity is 2. If the first indication information is inconsistent with the second indication information, the core network element indicates the terminal device to modify the first indication information.

Specifically, the terminal device may not modify the first indication information temporarily when it cannot be determined, based on the content included in the first information, whether the first indication information is the same as the second indication information.

For example, it is assumed that the first information includes the identifier of the first PLMN, the first available quantity, and the selection mode, the first information is PLMN 1-2-automatic mode, the first available quantity corresponding to the automatic mode is 2, and the first available quantity 2 is equal to the second available quantity 2 corresponding to the automatic mode. If the core network element cannot specifically determine whether the first indication information of the terminal device is the same as the second indication information, the terminal device does not modify the first indication information.

In a possible design solution, step S302 of sending, by the core network element, a registration response to the terminal device based on the first information may include: determining that the first information includes the selection mode and the selection mode is the manual mode, and sending the registration response to the terminal device.

In other words, when the first information includes the selection mode and the selection mode is the manual mode, the core network element may skip the step of determining whether the first information is the same as the second information, and directly send the registration response including the second indication information to the terminal device, to indicate the terminal device to update the first indication information.

For example, the first information includes the identifier of the first PLMN, the first available quantity, and the selection mode. If the first information is PLMN 1-2-manual mode, 2 indicates that the first available quantity is 2, and the selection mode is the manual mode, the core network element may skip the step of determining a relationship between the first available quantity and the second available quantity, and directly indicate the terminal device to update the first indication information.

For example, the first information includes the identifier of the first PLMN, the first indication information, and the selection mode. If the first information is PLMN 1-not allowed-manual mode, the selection mode is the manual mode, and the selection mode is the manual mode, the core network element may skip the step of determining whether the first indication information is the same as the second indication information, and directly indicate the terminal device to update the first indication information.

It should be noted that, if the first information includes the identifier of the first PLMN, the first indication information, and the selection mode, the first information is PLMN 1-not allowed-manual mode, the first indication information is "not allowed", and the second indication information is "not allowed". When the core network element may determine that the first indication information is the same as the second indication information, the core network element may not indicate the terminal device to update the first indication information.

In a possible design solution, the core network element sends the registration response to the terminal device based on the second information in step S302, where the registration response may include the second indication information.

In other words, when there may be no first information on the terminal device side, the core network element directly sends the registration response to the terminal device, to indicate the terminal device to configure, based on the registration response, a CAG selection policy. Then, the terminal device configures a selection policy of selecting a CAG by the terminal device when the terminal device accesses one or more PLMNs. In this way, a CAG selection policy can be flexibly configured.

S303: The terminal device sets the first information based on the registration response.

Optionally, step S303 of setting, by the terminal device, the first information based on the registration response may include: modifying the first indication information into the second indication information; modifying the first indication information into "allowed" if the first indication information is "not allowed", or modifying the first indication information into "not allowed" if the first indication information is "allowed"; or setting the second indication information.

For example, when the registration response includes the second indication information, the terminal device may modify the first indication information into the second indication information if the terminal device includes the first indication information.

For example, when the registration response includes the cause value, and the cause value indicates that content included in the first indication information is incorrect, if the terminal device includes the first indication information, and the first indication information includes "allowed" or "not allowed", the terminal device modifies the content currently included in the first indication information into other content. To be specific, the terminal device modifies the first indication information into "allowed" if the first indication information is "not allowed", or modifies the first indication information into "not allowed" if the first indication information is "allowed".

It should be noted that when the registration response includes the second indication information and the cause value, the terminal device may choose to modify the first indication information into the second indication information, or modify the content currently included in the first indication information into the other content. This is not limited in this application.

For example, when the registration response includes the second indication information, and the terminal device may not include the first indication information, in this case, the terminal device may directly set the second indication information based on the registration response.

Further, after configuring the first indication information, the terminal device may perform registration according to an existing registration procedure. For a specific implementation of performing registration according to the existing registration procedure, refer to the conventional technology. Details are not described in this embodiment of this application.

The method for configuring the CAG selection policy by the terminal device in step S302 and step S303 is completed in the registration procedure. It should be noted that the method in step S302 and step S303 may also be performed in a user configuration update (UCU) procedure. Correspondingly, the registration response is replaced by a configuration update instruction. The configuration update instruction indicates the terminal device to set the first information. Similarly, after configuring the CAG selection policy of the terminal device, the terminal device updates the configuration according to an existing user configuration update procedure. For a specific implementation, refer to the conventional technology.

Based on the communication method shown in FIG. 3, the core network element indicates, based on the first information that is from the terminal device and that indicates the CAG selection policy and/or based on the second information that is maintained by the core network element and that indicates the CAG selection policy, the terminal device to set the CAG selection policy for accessing the first PLMN. In this way, different CAG selection policies can be configured for different terminal devices in the first PLMN, to improve CAG selection policy configuration flexibility. Similarly, CAG selection policies may be further flexibly configured for different terminal devices in different PLMNs.

The following describes a communication method provided in an embodiment of this application by using the following example: A registration request includes first information in a registration procedure, and the first information includes an identifier of a first PLMN and first indication information.

Figure 4:
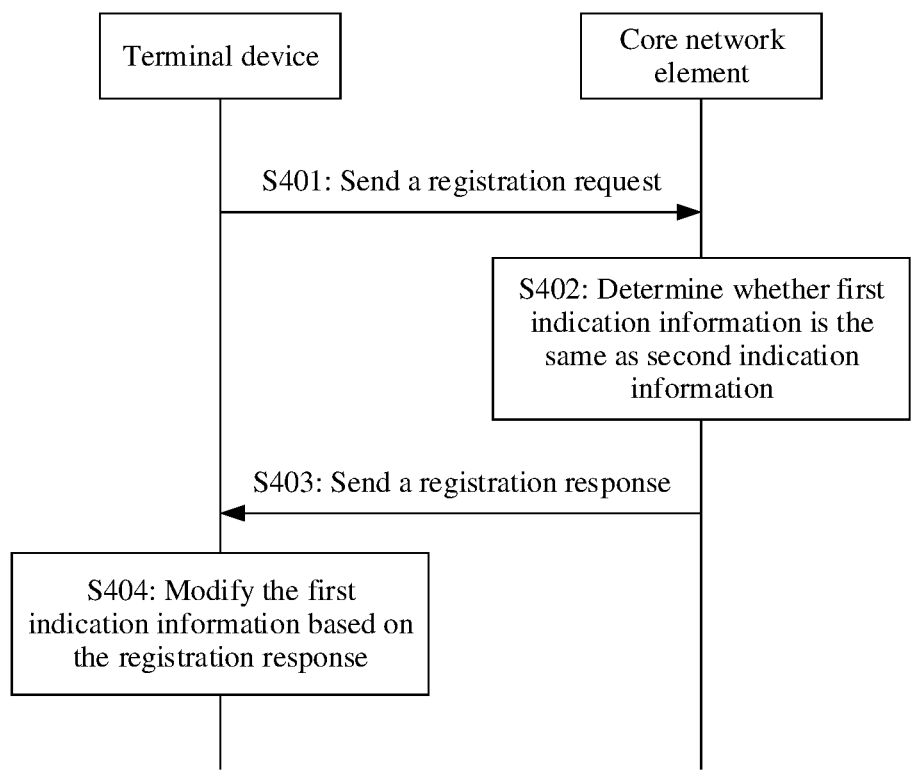
FIG. 4 is a schematic flowchart of a communication method according to an embodiment of this application.

FIG. 4 is a schematic flowchart of a communication method according to an embodiment of this application. The communication method is applicable to communication between the core network element and the terminal device shown in FIG. 1.

As shown in FIG. 4, the communication method includes the following steps.

S401: The terminal device sends a registration request to the core network element. Correspondingly, the core network element receives the registration request from the terminal device.

The registration request includes first information, and the first information includes an identifier of a first PLMN and first indication information.

It should be noted that the first information may include an identifier of one or more first PLMNs, and first indication information corresponding to each of the one or more first PLMNs.

The first indication information indicates whether the terminal device is allowed to select a CAG, beyond an allowed CAG list, for accessing the first PLMN. For a specific implementation of the first indication information, refer to step S301.

S402: The core network element determines whether the first indication information is the same as second indication information.

Optionally, the second indication information indicates whether the terminal device is allowed to select a CAG, beyond an allowed CAG list, for accessing the first PLMN. The second indication information may indicate a CAG selection policy maintained by the core network element side. For a specific implementation of the first indication information, refer to step S302.

For example, if the first indication information indicates that the terminal device is allowed to select a CAG, beyond the allowed CAG list, for accessing the first PLMN, and the second indication information indicates that the terminal device is not allowed to select a CAG, beyond the allowed CAG list, for accessing the first PLMN, the first indication information is different from the second indication information.

For example, if the first indication information indicates that the terminal device is not allowed to select a CAG, beyond the allowed CAG list, for accessing the first PLMN, and the second indication information indicates that the terminal device is not allowed to select a CAG, beyond the allowed CAG list, for accessing the first PLMN, the first indication information is the same as the second indication information.

S403: The core network element sends a registration response to the terminal device. Correspondingly, the terminal device receives the registration response from the core network element.

The registration response indicates the terminal device to modify the first indication information. In other words, if the first indication information is different from the second indication information, the core network element indicates the terminal device to modify the first indication information.

It should be noted that if the first indication information is the same as the second indication information, the registration response may indicate the terminal device to perform registration according to an existing registration procedure. For a specific implementation, refer to the conventional technology. Details are not described in this embodiment of this application.

Optionally, the registration response may include the second indication information and/or a cause value. The cause value indicates that the first indication information is different from the second indication information. In other words, the core network element may send the second indication information including "allowed" or "not allowed" to the terminal device; may send, to the terminal device, the cause value indicating that the first indication information is incorrect; or send the second indication information and the cause value, to indicate the terminal device to modify the first indication information of the first information.

S404: The terminal device modifies the first indication information based on the registration response.

For example, if the first indication information is "allowed", and the second indication information is "not allowed", when the registration response includes the second indication information, the terminal device may update the first indication information to the second indication information.

For example, if the first indication information is "allowed", when the registration response includes the cause value, and the cause value indicates that the content included in the first indication information is incorrect, the terminal device modifies the first indication information into "not allowed".

It should be noted that when the registration response includes the second indication information and the cause value, the terminal device may choose to modify the first indication information into the second indication information, or modify the content currently included in the first indication information into other content. This is not limited in this application.

Based on the communication method shown in FIG. 4, the core network element determines whether a CAG selection policy from the terminal device is the same as the CAG selection policy maintained by the core network element; and if the two CAG selection policies are different, indicates the terminal device to modify a CAG selection policy for accessing the first PLMN. In this way, different CAG selection policies can be configured for different terminal devices in the first PLMN, to improve CAG selection policy configuration flexibility. Similarly, selection policies of the same terminal device in different PLMNs can be further flexibly configured, to further improve the CAG selection policy configuration flexibility.

The following describes a communication method provided in an embodiment of this application by using the following example: A registration request includes first information in a registration procedure, and the first information includes an identifier of a first PLMN and a first available quantity.

Figure 5:
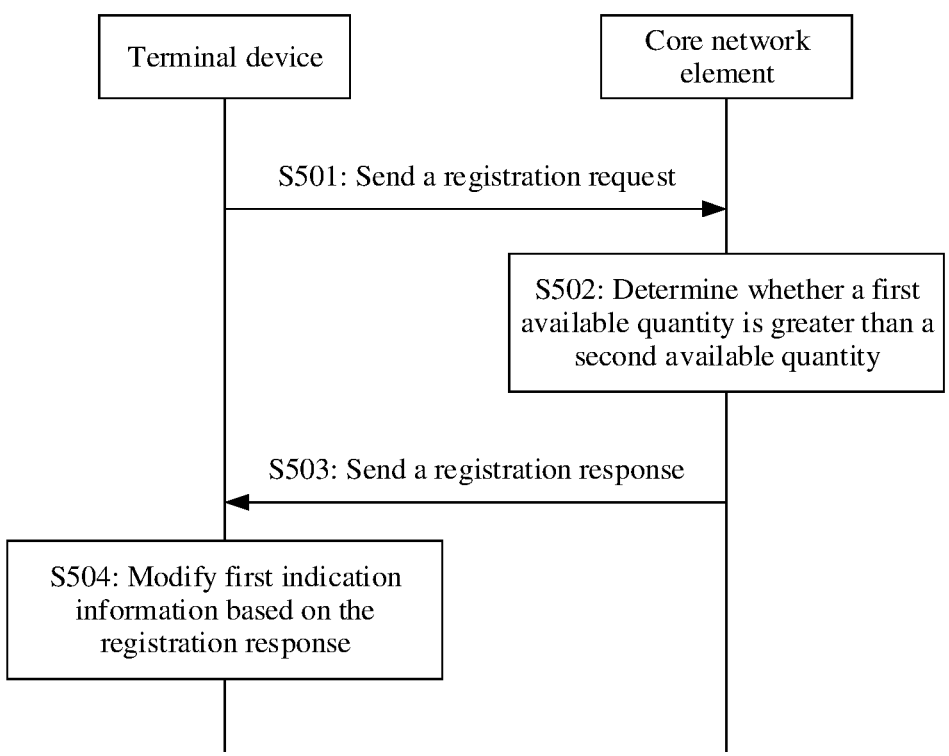
FIG. 5 is a schematic flowchart of a communication method according to an embodiment of this application.

FIG. 5 is a schematic flowchart of a communication method according to an embodiment of this application. The communication method is applicable to communication between the core network element and the terminal device shown in FIG. 1.

As shown in FIG. 5, the communication method includes the following steps.

S501: The terminal device sends a registration request to the core network element. Correspondingly, the core network element receives the registration request from the terminal device.

The registration request includes first information, and the first information includes an identifier of a first PLMN and a first available quantity.

It should be noted that the first information may include an identifier of one or more first PLMNs, and a first available quantity corresponding to each of the one or more first PLMNs.

The first available quantity indicates a quantity of CAGs that can be used by the terminal device when the terminal device accesses a first PLMN. In other words, the available quantity of CAGs that is determined by the terminal device may indirectly indicate a selection policy of selecting a CAG by the terminal device. For a specific implementation of the first available quantity, refer to step S301.

Optionally, the terminal device may determine the first available quantity based on first indication information and/or a selection mode. For a specific implementation, refer to step S301.

S502: The core network element determines whether the first available quantity is greater than a second available quantity.

Optionally, the second available quantity indicates a quantity of CAGs that can be used by the terminal device when the terminal device accesses the first PLMN. In other words, the second available quantity may indirectly represent a selection policy that is determined by the core network element and that is used by the terminal device to select a CAG. For a specific implementation of the second available quantity, refer to step S302.

Optionally, the core network element may determine the second available quantity based on second indication information and/or the selection mode. For a specific implementation, refer to step S302.

In an example, it is assumed that a CAG information list includes the PLMN 1 {a CAG 1, a CAG 2}, supported CAG information of the core network element is the PLMN 1 {the CAG 1, the CAG 2, a CAG 3, a CAG 6}, and the second indication information maintained by the core network element side is "not allowed". In this case, when the selection mode is an automatic mode, the second available quantity is 2; or when the selection mode is a manual mode, the second available quantity is 2, and the first indication information maintained by the terminal device side is "allowed".

In an example, it is assumed that the first information includes the identifier of the first PLMN and the first available quantity, the first information is PLMN 1-4, and 4 indicates that the first available quantity is 4. If the first available quantity is greater than the second available quantity, the terminal device is indicated to modify the first indication information.

In an example, it is assumed that the first information includes the identifier of the first PLMN and the first available quantity, the first information is PLMN 1-2, and 2 indicates that the first available quantity is 2. If the first available quantity is equal to the second available quantity, the terminal device does not modify the first indication information of the terminal device.

S503: The core network element sends a registration response to the terminal device. Correspondingly, the terminal device receives the registration response from the core network element.

The registration response indicates the terminal device to modify the first indication information. In other words, if the first available quantity is greater than the second available quantity, the core network element indicates the terminal device to modify the first indication information.

It should be noted that if the first available quantity is not greater than the second available quantity, the registration response may indicate the terminal device to perform registration according to an existing registration procedure. For a specific implementation, refer to the conventional technology. Details are not described in this embodiment of this application.

Optionally, the registration response may include the second indication information and/or a cause value. The cause value indicates that the first indication information is different from the second indication information. In other words, the core network element may send the second indication information including "allowed" or "not allowed" to the terminal device; may send, to the terminal device, the cause value indicating that the first indication information is incorrect; or send the second indication information and the cause value, to indicate the terminal device to modify the first indication information of the first information.

S504: The terminal device modifies the first indication information based on the registration response.

For a specific implementation of step S504 of modifying, by the terminal device, the first indication information based on the registration response, refer to step S404.

Based on the communication method shown in FIG. 5, the core network element determines whether the quantity, from the terminal device, of CAGs that can be used by the terminal device when the terminal device accesses the first PLMN is greater than the quantity that is maintained by the core network element and that is of CAGs that can be used by the terminal device when the terminal device accesses the first PLMN. If the quantity from the terminal device is greater than the quantity maintained by the core network element, the terminal device is indicated to modify a CAG selection policy for accessing the first PLMN. In this way, different CAG selection policies can be configured for different terminal devices in the first PLMN, to improve CAG selection policy configuration flexibility. Similarly, selection policies of the same terminal device in different PLMNs can be further flexibly configured, to further improve the CAG selection policy configuration flexibility.

The following describes a communication method provided in an embodiment of this application by using the following example: A registration request includes first information in a registration procedure, and the first information includes an identifier of a first PLMN and a selection mode.

Figure 6:
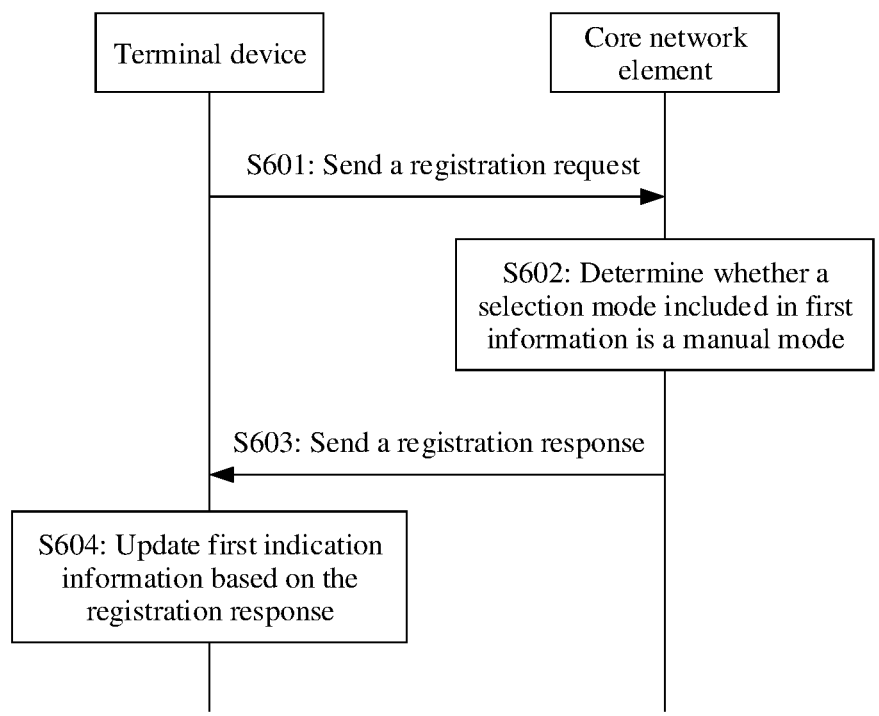
FIG. 6 is a schematic flowchart of a communication method according to an embodiment of this application.

FIG. 6 is a schematic flowchart of a communication method according to an embodiment of this application. The communication method is applicable to communication between the core network element and the terminal device shown in FIG. 1.

As shown in FIG. 6, the communication method includes the following steps.

S601: The terminal device sends a registration request to the core network element. Correspondingly, the core network element receives the registration request from the terminal device.

The registration request includes first information, the first information includes an identifier of a first PLMN and a selection mode, and the selection mode includes a manual mode. In this case, the terminal device is indicated to select a CAG this time in a manual selection mode for accessing a corresponding PLMN.

It should be noted that the first information may include an identifier of one or more first PLMNs, and a selection mode corresponding to each of the one or more first PLMNs.

S602: The core network element determines whether the selection mode included in the first information is the manual mode.

In other words, when the first information includes the selection mode and the selection mode is the manual mode, the core network element may perform step S603.

S603: The core network element sends a registration response to the terminal device. Correspondingly, the terminal device receives the registration response from the core network element.

The registration response indicates the terminal device to modify first indication information. The registration response may include second indication information.

In other words, if the first information includes the selection mode and the selection mode is the manual mode, the core network element may directly send the registration response including the second indication information to the terminal device, and regardless of whether a CAG selection policy maintained by the terminal device side is the same as a CAG selection policy maintained by the core network element side, directly indicate the terminal device to update the first indication information.

S604: The terminal device updates the first indication information based on the registration response.

A PLMN 1 is used as an example, and the first information is PLMN 1-manual mode.

In this case, if the first information includes the selection mode and the selection mode is the manual mode, the core network element sends the registration response including the second indication information, and the terminal device receives the registration response, and updates the first indication information to the second indication information.

Based on the communication method shown in FIG. 6, the core network element determines whether the terminal device selects a CAG this time in the manual mode for accessing the first PLMN; and if the terminal device selects a CAG this time in the manual mode for accessing the first PLMN, indicates the terminal device to update a CAG selection policy for accessing the first PLMN to a CAG selection policy that is maintained by the core network element side and that is for accessing the first PLMN. In this way, different CAG selection policies can be configured for different terminal devices in the first PLMN, to improve CAG selection policy configuration flexibility. Similarly, selection policies of the same terminal device in different PLMNs can be further flexibly configured, to further improve the CAG selection policy configuration flexibility.

The following describes a communication method provided in an embodiment of this application by using an example in which a registration request does not include first information in a registration procedure.

Figure 7:
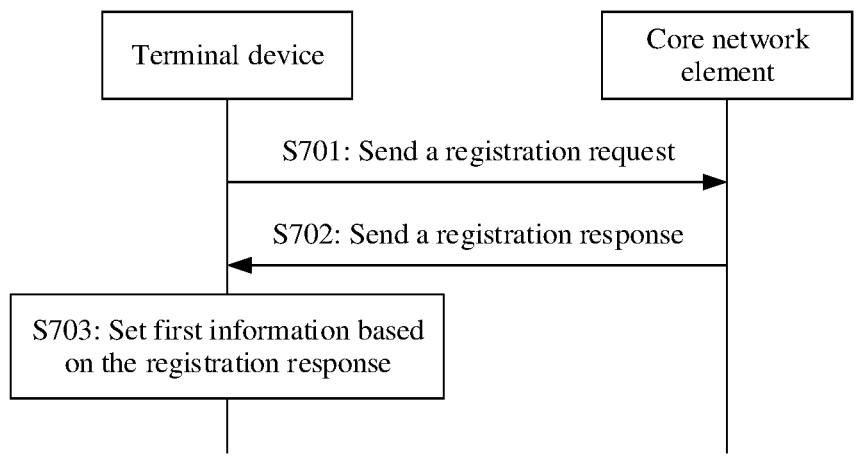
FIG. 7 is a schematic flowchart of a communication method according to an embodiment of this application.

FIG. 7 is a schematic flowchart of a communication method according to an embodiment of this application. The communication method is applicable to communication between the core network element and the terminal device shown in FIG. 1.

As shown in FIG. 7, the communication method includes the following steps.

S701: The terminal device sends a registration request to the core network element. Correspondingly, the core network element receives the registration request from the terminal device.

S702: The core network element sends a registration response to the terminal device. Correspondingly, the terminal device receives the registration response from the core network element.

The registration response indicates the terminal device to set a selection policy of manually selecting a CAG. The registration response includes second indication information.

Optionally, the second indication information indicates whether the terminal device is allowed to select a CAG, beyond an allowed CAG list, for accessing the first PLMN. For a specific implementation of the second indication information, refer to step S302.

S703: The terminal device sets first information based on the registration response.

A PLMN 1 is used as an example. If the second indication information is "allowed", the terminal device sets a selection policy of manually selecting a CAG for the PLMN 1 to "allowed", that is, PLMN 1-allowed. In other words, the terminal device directly configures, based on the received registration response, the selection policy of manually selecting the CAG.

Based on the communication method shown in FIG. 7, the core network element sends, to the terminal device, the CAG selection policy for accessing the first PLMN, to indicate the terminal device to configure the CAG selection policy for accessing the first PLMN. In this way, different CAG selection policies can be configured for different terminal devices in the first PLMN, to improve CAG selection policy configuration flexibility. Similarly, selection policies of the same terminal device in different PLMNs can be further flexibly configured, to further improve the CAG selection policy configuration flexibility.

The foregoing describes in detail the communication methods provided in example embodiments of this application with reference to FIG. 3 to FIG. 7. The following describes in detail a communication apparatus provided in an embodiment of this application with reference to FIG. 8.

Figure 8:
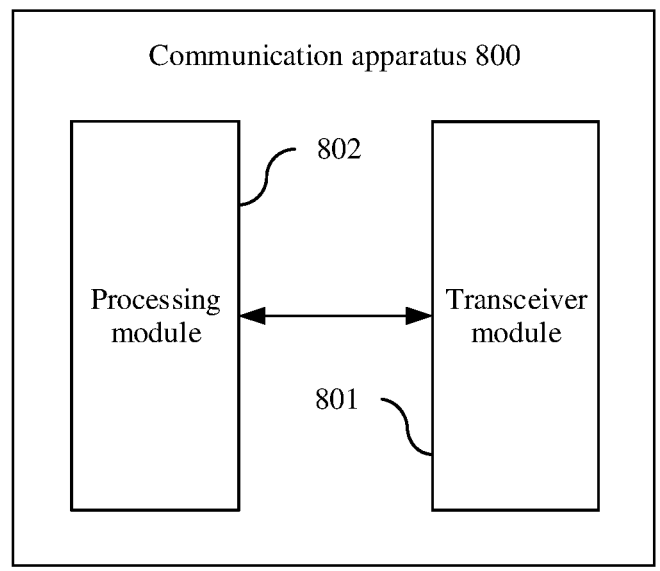
FIG. 8 is a schematic diagram of a structure of a communication apparatus according to an embodiment of this application.

FIG. 8 is a schematic diagram of a structure of a communication apparatus according to an embodiment of this application. As shown in FIG. 8, the communication apparatus 800 includes a transceiver module 801 and a processing module 802. For ease of description, FIG. 8 shows only main components of the communication apparatus.

The communication apparatus 800 may be configured to implement functions of the core network element in any one of the foregoing method embodiments, or may be configured to implement functions of the terminal device in any one of the foregoing method embodiments. For example, the communication apparatus may be the core network element, or may be the terminal device. The core network element or the terminal device may function as a network element in a hardware device, a software function running on dedicated hardware, or a virtualized function instantiated on a platform (for example, a cloud platform).

In a possible design solution, the communication apparatus 800 may be used as the core network element, and perform the steps performed by the core network element in the foregoing method embodiments. The transceiver module 801 may be configured to support the communication apparatus 800 to perform communication, for example, perform sending and/or receiving actions performed by the core network element in FIG. 3 to FIG. 7. The processing module 802 may be configured to support the communication apparatus 800 to perform the processing actions in the foregoing method embodiments, for example, processing actions performed by the core network element in FIG. 3 to FIG. 7. Optionally, the communication apparatus 800 may further include a storage module (not shown in FIG. 8 temporarily), configured to store program code and data of the communication apparatus 800. Specifically, refer to the following description:

The transceiver module 801 is configured to receive a registration request from a terminal device.

The processing module 802 is configured to control, based on first information and/or second information, the transceiver module 801 to send a registration response to the terminal device. The registration response indicates the terminal device to set the first information, the first information indicates a selection policy of selecting a closed access group CAG by the terminal device when the terminal device accesses a first public land mobile network PLMN, and the second information indicates a selection policy that is determined by the communication apparatus 800 and that is of selecting a CAG by the terminal device when the terminal device accesses the first PLMN.

Optionally, the first information may include an identifier of the first PLMN and one or more of the following information: first indication information, a first available quantity, and a selection mode. The first indication information indicates whether the terminal device is allowed to select a CAG, beyond an allowed CAG list, for accessing the first PLMN; the first available quantity indicates a quantity of CAGs that can be used by the terminal device when the terminal device accesses the first PLMN; and the selection mode includes a manual mode or an automatic mode.

Optionally, the second information includes the identifier of the first PLMN and one or more of the following information: second indication information and a second available quantity. The second indication information indicates whether the terminal device is allowed to select a CAG, beyond the allowed CAG list, for accessing the first PLMN; and the second available quantity indicates a quantity of CAGs that can be used by the terminal device when the terminal device accesses the first PLMN.

In a possible design solution, the processing module 802 is further configured to: determine that the first information is different from the second information, and control the transceiver module 801 to send the registration response to the terminal device.

Optionally, that the first information is different from the second information includes: The first indication information is different from the second indication information; and/or the first available quantity is greater than the second available quantity.

In a possible design solution, the processing module 802 is further configured to: determine that the first information includes the selection mode and the selection mode is the manual mode, and control the transceiver module 801 to send the registration response to the terminal device.

Optionally, the registration response may include the second indication information and/or a cause value, and the cause value indicates that the first indication information is different from the second indication information.

In a possible design solution, the processing module 802 is further configured to determine the second available quantity based on the second indication information and/or the selection mode.

Optionally, the registration request may include the first information. In a possible design solution, the transceiver module 801 is further configured to send a broadcast message to the terminal device by using an access network device. The broadcast message includes third indication information, and the third indication information indicates whether the terminal device is allowed to select a CAG, beyond the allowed CAG list, for accessing the first PLMN.

It should be noted that the transceiver module 801 may include a receiving module and a sending module (which are not separately shown in FIG. 8). The receiving module is configured to receive data and/or signaling from the terminal device. The sending module is configured to send data and/or signaling to the terminal device. A specific implementation of the transceiver module 801 is not limited in this application.

Optionally, the communication apparatus 800 may further include a storage module (not shown in FIG. 8). The storage module stores a program or instructions. When the processing module 802 executes the program or the instructions, the communication apparatus 800 may be enabled to perform functions of the core network element in the communication method shown in any one of FIG. 3 to FIG. 7.

It should be noted that the communication apparatus 800 may be the core network element shown in FIG. 1 or the communication apparatus 200 shown in FIG. 2, or may be a chip (system) or another component or assembly that can be disposed in the core network element or the communication apparatus 200. This is not limited in this application.

In addition, for a technical effect of the communication apparatus 800, refer to the technical effects of the communication methods shown in FIG. 3 to FIG. 7. Details are not described herein again.

In another possible design solution, the communication apparatus 800 may be used as the terminal device, and perform the steps performed by the terminal device in the foregoing method embodiments. The transceiver module 801 may be configured to support the communication apparatus 800 to perform communication, for example, perform sending and/or receiving actions performed by the terminal device in FIG. 3 to FIG. 7. The processing module 802 may be configured to support the communication apparatus 800 to perform the processing actions in the foregoing method embodiments, for example, processing actions performed by the terminal device in FIG. 3 to FIG. 7. Optionally, the communication apparatus 800 may further include a storage module (not shown in FIG. 8 temporarily), configured to store program code and data of the communication apparatus 800. Specifically, refer to the following description:

The transceiver module 801 is configured to send a registration request to the core network element. The transceiver module 801 is further configured to receive a registration response from the core network element. The registration response indicates the communication apparatus 800 to set first information, and the first information indicates a selection policy of selecting a closed access group CAG by the communication apparatus when the communication apparatus accesses a first public land mobile network PLMN.

The processing module 802 is configured to set the first information based on the registration response.

Optionally, the first information may include an identifier of the first PLMN and one or more of the following information: first indication information, a first available quantity, and a selection mode. The first indication information indicates whether the communication apparatus 800 is allowed to select a CAG, beyond an allowed CAG list, for accessing the first PLMN; the first available quantity indicates a quantity of CAGs that can be used by the communication apparatus 800 when the communication apparatus 800 accesses the first PLMN; and the selection mode includes a manual mode or an automatic mode.

Optionally, the registration response may include second indication information and/or a cause value, and the cause value indicates that the first indication information is incorrect.

In a possible design solution, the processing module 802 is further configured to modify the first indication information into the second indication information; the processing module 802 is further configured to modify the first indication information into "allowed" if the first indication information is "not allowed", or the processing module 802 is further configured to modify the first indication information into "not allowed" if the first indication information is "allowed"; or the processing module 802 is further configured to set the second indication information.

In a possible design solution, the processing module 802 is further configured to determine the first available quantity based on the first indication information and/or the selection mode.

Optionally, the registration request may include the first information.

In a possible design solution, the transceiver module 801 is further configured to receive a broadcast message. The broadcast message includes third indication information, and the third indication information indicates whether the communication apparatus 800 is allowed to select a CAG, beyond the allowed CAG list, for accessing the first PLMN. The processing module 802 is further configured to modify the first indication information into the third indication information if the third indication information is different from the first indication information; or the processing module 802 is further configured to skip modifying the first indication information if the third indication information is different from the first indication information.

It should be noted that the transceiver module 801 may include a receiving module and a sending module (which are not separately shown in FIG. 8). The receiving module is configured to receive data and/or signaling from the core network element. The sending module is configured to send data and/or signaling to the core network element. A specific implementation of the transceiver module 801 is not limited in this application.

Optionally, the communication apparatus 800 may further include a storage module (not shown in FIG. 8). The storage module stores a program or instructions. When the processing module 802 executes the program or the instructions, the communication apparatus 800 may be enabled to perform functions of the terminal device in the communication method shown in any one of FIG. 3 to FIG. 7.

It should be noted that the communication apparatus 800 may be the terminal device shown in FIG. 1 or the communication apparatus 200 shown in FIG. 2, or may be a chip (system) or another component or assembly that can be disposed in the terminal device or the communication apparatus 200. This is not limited in this application.

In addition, for a technical effect of the communication apparatus 800, refer to the technical effects of the communication methods shown in FIG. 3 to FIG. 7. Details are not described herein again.

An embodiment of this application further provides a communication system. The system includes a core network element and a terminal device. Optionally, the communication system may further include an access network device. The core network element may be an AMF network element.

An embodiment of this application provides a computer-readable storage medium. The computer-readable storage medium includes a computer program or instructions. When the computer program or the instructions are run on a computer, the computer is enabled to perform the communication method in the foregoing method embodiments.

An embodiment of this application provides a computer program product, including a computer program or instructions. When the computer program or the instructions are run on a computer, the computer is enabled to perform the communication method in the foregoing method embodiments.

It should be understood that the processor mentioned in embodiments of this application may be a central processing unit (CPU), or the processor may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It should also be understood that the memory in embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. By way of example but not limitation, random access memories (RAM) in many forms may be used, for example, a static random access memory (SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or a part of the foregoing embodiments may be implemented by software, hardware (for example, circuits), firmware, or any combination thereof. When software is used to implement embodiments, all or a part of embodiments may be implemented in a form of a computer program product. The computer program product includes one or more computer instructions or computer programs. When the computer instructions or computer programs are loaded and executed on a computer, all or a part of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired or wireless manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium. The semiconductor medium may be a solid-state disk.

It should be understood that the term "and/or" in this specification describes only an association relationship between associated objects and represents that three relationships may exist. For example, A and/or B may represent the following three cases: Only A exists, both A and B exist, and only B exists. A and B may be singular or plural. In addition, the character "/" in this specification generally indicates an "or" relationship between the associated objects, or may indicate an "and/or" relationship. For details, refer to the foregoing and subsequent descriptions for understanding.

In this application, "at least one" means one or more, and "a plurality of" means two or more. At least one of the following items (pieces) or a similar expression thereof refers to any combination of these items, including any combination of singular items (pieces) or plural items (pieces). For example, at least one item (piece) of a, b, or c may indicate: a, b, c, a-b, a-c, b-c, or a-b-c, where a, b, and c may be singular or plural.

It should be understood that sequence numbers of the foregoing processes do not mean execution sequences in embodiments of this application. The execution sequences of the processes should be determined according to functions and internal logic of the processes, and should not be construed as any limitation on the implementation processes of embodiments of this application.

A person of ordinary skill in the art may be aware that, in combination with the examples described in embodiments disclosed in this specification, units or modules, and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit or module, refer to a corresponding process in the foregoing method embodiments. Details are not described herein again.

In the several embodiments provided in this application, it should be understood that, the disclosed system, apparatus, and method may be implemented in other manners. For example, the described apparatus embodiments are merely examples. For example, division into the units or modules is merely logical function division, or may be other division in actual implementation. For example, a plurality of units or modules may be combined or integrated into another system, some units or modules may be ignored, or functions corresponding some units or modules are not performed. In addition, the displayed or discussed mutual couplings or direct couplings or communication connections may be implemented through some interfaces. The indirect couplings or communication connections between the apparatuses or units/modules may be implemented in electrical, mechanical, or other forms.

The units/modules described as separate parts may or may not be physically separate, and parts displayed as units/modules may or may not be physical units/modules, may be located in one position, or may be distributed on a plurality of network units/modules. Some or a part of the units/modules may be selected based on actual requirements to achieve the objectives of the solutions of embodiments.

In addition, the functional units/modules in embodiments of this application may be integrated into one processing unit/module, each of the units/modules may exist alone physically, or two or more units/modules are integrated into one unit/module.

When the functions are implemented in a form of a software functional unit/module and sold or used as an independent product, the functions may be stored in a computer-readable storage medium. Based on such an understanding, the technical solutions of this application essentially, or the part contributing to the prior art, or a part of the technical solutions may be implemented in a form of a software product. The computer software product is stored in a storage medium, and includes several instructions for instructing a computer device (which may be a personal computer, a server, a network device, or the like) to perform all or a part of the steps in the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, wherein the method comprises:
    receiving a registration request from a terminal device, wherein the registration request comprises first information, wherein the first information indicates a selection policy that is maintained by the thermal device and that is of selecting a closed access group (CAG) by the terminal device terminal device accesses a first public land mobile network (PLMN);
    determining the first information is different from second information, wherein the second information indicates a selection policy that is maintained by a core network element and that is of selecting a CAG by the terminal device when the terminal device accesses the first PLMN; and
    sending a registration response to the terminal device, wherein the registration response indicates the terminal device to reconfigure the first information in accordance with the registration response.

2. The communication method according to claim 1, wherein the first information comprises an identifier of the first PLMN and one or more of: first indication information, a first available quantity, and a selection mode, wherein
    the first indication information indicates whether the terminal device is allowed to select a CAG, that is not in an allowed CAG list obtained by the terminal device, for accessing the first PLMN;
    the first available quantity indicates a quantity of CAGs that can be used by the terminal device when the terminal device accesses the first PLMN; and
    the selection mode comprises a manual mode or an automatic mode.

3. The communication method according to claim 2, wherein the sending a registration response to the terminal device comprise sending a registration response to the terminal device based on first information, and the sending a registration response to the terminal device based on first information comprises: determining that the first information comprises the selection mode and the selection mode is the manual mode, and, after the determining, sending the registration response to the terminal device.

4. The communication method according to claim 1, wherein the second information comprises the identifier of the first PLMN and one or more of: second indication information and a second available quantity, wherein
    the second indication information indicates whether the terminal device is allowed to select a CAG, that is not in an allowed CAG list obtained by the terminal device, for accessing the first PLMN; and
    the second available quantity indicates a quantity of CAGs that can be used by the terminal device when the terminal device accesses the first PLMN.

5. The communication method according to claim 4, wherein the registration response comprises the second indication information and/or a cause value, and the cause value indicates that the first indication information is different from the second indication information.

6. The communication method according to claim 4, wherein the method further comprises:
    determining the second available quantity based on the second indication information and/or the selection mode.

7. The communication method according to claim 1, wherein the sending a registration response to the terminal device comprises sending a registration response to the terminal device based on first information and second information, and sending a registration response to the terminal device based on first information and second information comprises: determining that the first information is different from the second information, and, after the determining, sending the registration response to the terminal device.

8. The communication method according to claim 1, wherein the registration request comprises the first information.

9. The communication method according to claim 1, wherein the method further comprises:
    sending a broadcast message to the terminal device by using an access network device, wherein the broadcast message comprises third indication information, and the third indication information indicates whether the terminal device is allowed to select a CAG, that is not in the allowed CAG list, for accessing the first PLMN.

10. A communication method, comprising:
    sending a registration request to a core network element;
    receiving a registration response from the core network element, wherein the registration response indicates a terminal device to reconfigure first information that is maintained by the terminal device in accordance with the registration response, wherein the first information indicates the selection policy of selecting a closed access group (CAG) by the terminal device when the terminal device accesses a first public land mobile network (PLMN); and based on the registration response, reconfiguring the first information maintained by the terminal device.

11. The communication method according to claim 10, wherein the first information comprises an identifier of the first PLMN and one or more of: first indication information, a first available quantity, and a selection mode, wherein the first indication information indicates whether the terminal device is allowed to select a CAG, that is not in an allowed CAG list obtained by the terminal device, for accessing the first PLMN;

the first available quantity indicates a quantity of CAGs that can be used by the terminal device when the terminal device accesses the first PLMN; and the selection mode comprises a manual mode or an automatic mode.

12. The communication method according to claim 11, wherein the method further comprises:

receiving a broadcast message, wherein the broadcast message comprises third indication information, and the third indication information indicates whether the terminal device is allowed to select a CAG, that is not in the allowed CAG list, for accessing the first PLMN; and either modifying the first indication information into the third indication information if the third indication information is different from the first indication information, or skipping modifying the first indication information if the third indication information is the same as the first indication information.

13. The communication method according to claim 10, wherein the registration response comprises second indication information and/or a cause value, and the cause value indicates that the first indication information is incorrect.

14. The communication method according to claim 10, wherein the setting the first information based on the registration response comprises:

modifying the first indication information into the second indication information;

either modifying the first indication information into allowed if the first indication information is not allowed, or modifying the first indication information into not allowed if the first indication information is allowed; or setting the second indication information.

15. The communication method according to claim 10, wherein the registration request comprises the first information.

16. A communication apparatus comprising a processor and at least one memory coupled to the processor, wherein the processor is configured to execute a computer program or instructions stored in the at least one memory, to cause the apparatus to perform operations comprising:

receiving a registration request from a terminal device, wherein the registration request comprises first information, wherein the first information indicates a selection policy that is maintained by the terminal device and that is of selecting a closed access group (CAG) by the terminal device when the terminal device accesses a first public land mobile network (PLMN);

determining the first information is different from second information, wherein the second information indicates a selection policy that is maintained by a core network element and that is of selecting a CAG by the terminal device when the terminal device accesses the first PLMN; and sending a registration response to the terminal device, wherein the registration response indicates the terminal device to reconfigure the first information in accordance with the registration response.

17. The communication apparatus according to claim 16, wherein the first information comprises an identifier of the first PLMN and one or more of: first indication information, a first available quantity, and a selection mode, wherein the first indication information indicates whether the terminal device is allowed to select a CAG, that is not in an allowed CAG list obtained by the terminal device, for accessing the first PLMN;

the first available quantity indicates a quantity of CAGs that can be used by the terminal device when the terminal device accesses the first PLMN; and the selection mode comprises a manual mode or an automatic mode.

18. The communication apparatus according to claim 16, wherein the second information comprises the identifier of the first PLMN and one or more of: second indication information and a second available quantity, wherein the second indication information indicates whether the terminal device is allowed to select a CAG, that is not in the allowed CAG list, for accessing the first PLMN; and the second available quantity indicates a quantity of CAGs that can be used by the terminal device when the terminal device accesses the first PLMN.

19. The communication apparatus according to claim 16, wherein the processor is further configured to execute the computer program or instructions stored in the at least one memory, to enable the apparatus to perform further operations comprising:

determining that the first information is different from the second information, and, after the determining, sending the registration response to the terminal device.

20. A communication apparatus comprising a processor and at least one memory coupled to the processor, and the processor is configured to execute a computer program or instructions stored in the at least one memory, to cause the apparatus to perform operation comprising:

sending a registration request to a core network element;

receiving a registration response from the core network element, wherein the registration response indicates a terminal device to reconfigure first information that is maintained by the terminal device in accordance with be the response, wherein the first information indicates the selection policy of selecting a closed access group (CAG) by the terminal device when the terminal device accesses a first public land mobile network (PLMN); and based on the registration response, reconfiguring the first information maintained by the terminal device.

21. The communication apparatus according to claim 20, wherein the first information comprises an identifier of the first PLMN and first indication information, the registration response includes second information, and the second information comprises the identifier of the first PLMN and second indication information, and wherein the processor is further configured to execute the computer program or instructions stored in the at least one memory, to cause the apparatus to perform further operations comprising:

modifying the first indication information into the second indication information;

either modifying the first indication information into allowed if the first indication information is not allowed, or modifying the first indication information into not allowed if the first indication information is allowed; or set the second indication information.

* * * * *